2,785,150

United States Patent Office

Patented Mar. 12, 1957

2,785,150

SYNTHETIC ELASTOMERIC POLYESTER CONDENSATION POLYMERS

Leonard C. Kreider, Wadsworth, and Robinson F. Nichols, Akron, Ohio, assignors to The B. F. Goodrich Company, New York, N. Y., a corporation of New York No Drawing. Application July 18, 1952,
Serial No. 299,738

13 Claims. (Cl. 260—75)

This invention relates to synthetic elastomeric polymers of the polyesterurethane class and to the preparation thereof. More particularly it relates to the condensation reaction of certain polyesters, water and organic diisocyanates to produce processable gums of a rubbery nature; and to the subsequent cross-linking or vulcanization of such gums by further reaction with organic polyisocyanates or other suitable agents to give elastic rubbery products with exceptional properties.

Certain condensation polymers of the polyesterurethane class possessing rubbery properties are well known. The most useful of these polymers have been found to be the reaction products of polyisocyanates with anhydrous polyesters or polyesteramides. Such reaction products may be formed into rubbery materials of the nature of vulcanized rubber in two principal ways. A vulcanized product may be obtained by the addition of an organic polyisocyanate to a reaction product of about equimolar quantities of an anhydrous polyester and an organic diisocyanate, and subsequent vulcanization under heat and pressure. The products obtained by means of this method are difficult to control and the physical properties of the vulcanized polymers vary widely. Further, a gas believed to be carbon dioxide is often given off, causing blowing during the vulcanization step and resulting in undesirable bubbles and holes in the vulcanized product. A vulcanized product may also be obtained in a three-stage process by the reaction of an anhydrous polyester with an excess of polyisocyanate followed by the development of a cross-linked product by addition of water in an internal mixer and final heating to produce the vulcanized product. However, in this process rubbery products with good processing characteristics are not obtained in the second stage and the power requirements for such mixing are high. Furthermore final cured products with optimum physical properties are not obtained.

It is therefore an object of this invention to provide a modified polyesterurethane polymer, and a process for making thereof, which is an easily reproduced, processable gum that can be vulcanized to a rubbery elastomer free of bubbles and holes with consistently optimum physical properties. Other objects will appear hereinafter.

We have now discovered, quite unexpectedly and contrary to prior teachings, that these and other objects may be realized if water is present during the reaction of the polyester and organic diisocyanate in a chain lengthening step to form a modified polyesterurethane. Heretofore anhydrous polyester has been reacted with the diisocyanate but we have found that when water, a polyester and an organic diisocyanate are reacted together, an essentially linear, processable gum results. When this gum is vulcanized by means of additional amounts of a polyisocyanate or other suitable agent, no gas is formed and a vulcanized product free of bubbles and holes is obtained. It has been further discovered that when the amount of water used in the gum formation reaction is controlled within hereinafter defined limits, depending upon the amounts of diisocyanate and polyester employed, a reproducible easily processed gum is obtained which may be vulcanized with additional polyisocyanate to form a rubbery product with consistently optimum physical properties. By means of this invention a uniform product from batch to batch or continuously may be readily prepared.

In accordance with this invention, reproducible polymers of an essentially linear nature may be prepared which have good processing characteristics and which may be vulcanized to product products having exceptionally good physical properties, some of which are superior to those of vulcanized natural rubber. For example, vulcanized "pure gum" elastomers may be prepared which have tensile strengths in excess of 10,000 p. s. i. and with resistance to hydrocarbon solvents and oils, abrasion resistance and oxidation resistance far superior to natural rubber. These results may be accomplished by reacting a calculated amount of water with a polyester and an organic diisocyanate, preferably in proportions such that the diisocyanate is present in a molar quantity roughly equivalent to the total molar quantities of polyester and water utilized, so that a processable gum is formed. In this reaction the polyester chain is lengthened and it is believed that reactive sites, in the nature of substituted urea linkages, are incorporated into the polymer chains, thus forming a modified polyesterurethane which if proper proportions of reactants have been used will be in the form of a processable gum. Additional calculated amounts of an organic diisocyanate, or other suitable curing agent as herein described, are incorporated into the gum on a rubber mill or an internal mixer and the product cross linked or vulcanized in molds in conventional heated presses to give cured products.

In order to achieve these results, it is of critical importance that the water content of the polyester be carefully controlled, and that the gum be free of excess water during the vulcanization step. The manner of accomplishing the close control will be given hereinafter.

The polyester is prepared by an esterification reaction of an aliphatic dibasic (dicarboxylic) acid, or an anhydride thereof, with a glycol. For example, suitable reactants are adipic acid and ethylene glycol. Molar ratios of about one and one half to three moles of glycol to one mole of dibasic acid are preferably employed so as to obtain chains containing a preponderance of terminal hydroxyl groups. Polyesters formed by reaction of mixed dibasic acids and mixed glycols may be employed. The polyester is hygroscopic and should be protected from contact with moisture.

The acid, or its anhydride, and the glycol are reacted together by heating at a temperature about or below 200° C. After a few hours, and while still heating the reactants, a vacuum is gradually applied, reaching about 1.0 mm. of mercury after about 15 hours. The water of esterification and excess ethylene glycol are removed during this time and this may be facilitated by bubbling dry nitrogen or other inert gas through the molten mass.

Esterification under the above conditions yields linear polyesters of a waxy low-melting nature having molecular weights from 400 to 1600. If desired, polyesters of other molecular weights may be obtained by changing the above reaction conditions. For example, at higher temperatures and longer reaction and evacuation periods, polyesters having higher molecular weights in the range of 2000 to 3000 are obtained.

The basic polyester utilized includes polyesters prepared from esterification of such dicarboxylic acids as malonic, succinic, glutaric, adipic, pimelic, sebacic, suberic, azelaic, maleic and the like. It is not essential that the acid be used, the acid anhydride or esters of dibasic acids with volatile alcohols may be employed. Mixtures of acids may also be used.

The glycols utilized in the preparation of the polyester by reaction with the dicarboxylic acid may be ethylene glycol, 1,3-butanediol, 1,4-butanediol, pentamethylene glycol, hexamethylene glycol, decamethylene glycol, diethylene glycol, triethylene glycol, 1,2-propanediol, 1,3-propanediol, 1,2-butanediol and the like. Mixtures of glycols may be employed. The linear aliphatic polyesters ordinarily employed have a molecular weight of 500 to 2500 and more preferably from 500 to 1500.

In the practice of this invention it is preferred that the polyester be essentially anhydrous, but this is not absolutely necessary. The polyester may be prepared in an anhydrous state and carefully kept so in storage, but polyester containing less than about 1 mol of water per mol of polyester may be utilized if the water content is accurately determined by standard laboratory procedures and the amount of diisocyanate reacted is adjusted for this residual moisture.

A preferred procedure is to add the desired amount of water to an anhydrous polyester such as hydroxyl polyethylene adipate in a closed container, heat the mix to about 50–60° C. until the polyester melts and is of low viscosity and then agitate the two materials thoroughly under conditions such that no water is lost. A calculated amount of an organic diisocyanate is then added and the mix is stirred and heated to about 100° C. or higher as may be necessary to melt or dissolve the diisocyanate. From 1.0 to 2.0 mols of an organic diisocyanate are employed. The homogeneous mixture is then poured out into a container, heated further to complete the reaction and then cooled. Exposure of this product to moisture should be avoided. When ready to use, the gum product is worked on a mill or other mixer at 175–250° F. At this temperature all excess moisture will be driven off. The desired amount of vulcanizing agent such as a low volatility polyisocyanate is added and the compounded product cured under pressure at a temperature of about 275° F.

For gum formation, molar ratios of diisocyanate to polyester to water of 1.55:1.00:0.50 or 1.30:1.00:0.50 or 1.32:1.00:0.30 or 1.22:1.00:0.30 or 1.20:1.00:0.20 or 1.15:1.00:0.30 are typical. The higher ratios of water give gums which vulcanize to "tighter" cures, probably the result of the introduction of greater numbers of substituted urea linkages which are potential cross-linking sites.

The mols of diisocyanate employed are about equivalent to the sum of mols of polyester plus mols of water, and are adjusted for the various polyester types so that each processable gum may be milled at a temperature of between 170 and 250° F. In this temperature range the gums do not pick up moisture during processing and will lose water that may have been picked up after the gum formation stage, since the presence of moisture during the vulcanization step is generally undesirable. The milling temperature of the gum may be increased by increasing the relative amount of diisocyanate employed and conversely the milling temperature of the gum may be decreased by lowering the relative amount of diisocyanate reacted. p-Phenylene diisocyanate, m-phenylene diisocyanate and 4,4'-diisocyanato dibenzyl are preferred for this gum formation reaction. Other organic diisocyanates which have been found useful include naphthylene - 1,5 - diisocyanate, diphenylmethane - p,p' - diisocyanate, triphenylmethane - p,p' - diisocyanate, m-tolylene diisocyanate, hexamethylene diisocyanate, other polyisocyanates and the like as well as mixtures thereof.

The preferred molar amount of water used is less than 1 mol when employed with one mol of polyester that is, the molar ratio of water to polyester is less than one to one, ranging from 0.1 to 1 mol of water. For polyesters of molecular weights from 1200 to 1500 a ratio of less than 0.30 mol of water to one mol of polyester is preferred, for example, two tenths mol of water to 1 mol of hydroxyl polyethylene adipate. The water may be introduced in several ways. There may be residual water of esterification in the polyester and if determined accurately this water may be utilized. Preferably, anhydrous polyester is employed and the desired amount of water is added to the polyester wgith suitable precautions taken to prevent loss. Water may be introduced into the polyester by means of water containing materials such as the hydrates which will release this water at or below the temperature of the gum formation reaction which is about 100° C. Inorganic and metal organic salts containing water of hydration or crystallization such as Na$_3$PO$_4$.12H$_2$O, Na$_2$SiO$_3$.9H$_2$O, NaC$_2$H$_3$O$_2$.3H$_2$O BaBr$_2$.2H$_2$O and SrCl$_2$.6H$_2$O may be utilized in this way. Generally, hydrates of alkali metal and alkaline earth metal salts such as the halides, phosphates, sulfates, carbonates and salts of the organic acids are the most useful hydrates for this use. Those found useful release water of hydration at or below the temperature of the gum formation, that is, between 75 and 110° C. Materials with known amounts of adsorbed water such as clay or silica gel, or other materials such as boric acid which decompose to yield water at or near the gum formation temperature, or any material that is capable of releasing water at the reaction temperature may be profitably employed. Many other examples of materials of the types listed above may be found by referring to any standard chemical handbook or reference. The amount of the water releasing hydrate or other material employed will be determined by the amount of water released at the gum formation temperature and is calculated on a molar basis, and is thus a molar quantity of a substance capable of releasing 0.1 to 1 mol of water. This technique offers an alternate method of control of the amount of water introduced during the reaction stage.

To effect a cure or vulcanization of the gums of this invention into elastomeric products, additional agents such as an organic diisocyanate is incorporated mechanically into the gum on a rubber or plastic mill or in an internal mixer at temperatures above 150°, preferably from about 170 to 250° F., so that no moisture is absorbed from the air. The compounded stocks are kept in low moisture or a moisture free atmosphere until vulcanized.

The amount of diisocyanate utilized to effect optimum cure of the gum is preferably equal to or slightly in excess of two times the mols of water plus the mols of polyester used, less the mols of diisocyanate employed in the gum formation. For example, a gum formed from a diisocyanate: polyester: water ratio of 1.40: 1.00:0.50 would be cured by

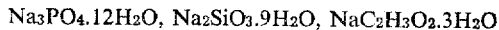

$$[(0.50 \times 2)+1.00]-1.40=0.6$$

mols of diisocyanate. As much as 20 parts of diisocyanate by weight to 100 parts by weight of the modified polyesterurethane may be employed but optimum physical properties are obtained with lesser quantities.

The agents employed to effect the vulcanization of the gum are preferably organic diisocyanates with low volatility characteristics. Either aromatic or aliphatic diisocyanates may be employed but the former are preferred.

For example, diphenyl methane-4,4'-diisocyanate, 4,4'-diisocyanato dibenzyl, naphthylene-1,5-diisocyanate, polyisocyanates and the like may be used. The phenylene diisocyanates such as p-phenylene diisocyanate are particularly useful as cross linking agents but suffer from the disadvantage of being somewhat volatile. The so-called pseudo-diisocyanates which are thermally labile addition products of the diisocyanates which regenerate the original reactants at or near vulcanization temperatures may be employed. The thermally labile polymers of organic diisocyanates such as the dimer of m-tolylene diisocyanate may be used to cure the polymers of this invention. Other polyisocyanates such as the aliphatic diisocyanates represented by hexamethylene diisocyanate may be employed. Formaldehyde, formaldehyde liberating substances and certain formaldehyde-amine condensation products and the like may also be employed to vulcanize the gums of this invention.

Examples demonstrating the practice of this invention follow:

EXAMPLE I

*Preparation of a hydroxyl polyethylene adipate*

Three mols of ethylene glycol and one mol of adipic acid are mixed together in a vented container and heated at about 185° C. at atmospheric pressure for 4 to 6 hours. A vacuum is then applied and the internal pressure slowly reduced to 30 to 60 mm. of mercury and held at this point for about 6 hours, and finally reduced to 1 to 2 mm. and held there for 4 to 6 hours. The resulting esters, hydroxyl polyethylene adipates, are waxy solids on cooling to room temperature with melting points from 40 to 46° C., molecular weights from 600 to 1200, hydroxyl contents from 2.8 to 5.7 percent, low acid number and contain less than 0.5 percent water and free ethylene glycol. Higher molecular weight material may be obtained by evacuating at a higher temperature, about 200° C. and holding under vacuum for longer periods of time.

EXAMPLE II

*Preparation of the modified polyesterurethane gum*

A polyester, prepared in a manner similar to that described in Example I is here reacted with water and an aromatic diisocyanate. A molar ratio of an anhydrous hydroxyl polyethylene adipate, of about 1200 molecular weight, to water of 1.00 to 0.30 is employed. 0.30 mol of water is added to 1.00 mol of anhydrous polyester in an internal mixer. The mixture is heated to 50 to 60° C. and the reagents thoroughly mixed. Care is taken not to lose any water. 1.25 mols of p-phenylene diisocyanate are then added to the liquid mixture and the batch slowly heated to about 110° C. and held there for about 30 minutes or as long as required to dissolve the diisocyanate. The molten mix is then poured into a container coated with wax or other non-adhesive material, heated for two hours at 135° C. to complete the reaction and then allowed to cool, preferably in a moisture free atmosphere. The product, on cooling, is a snappy, amber, transparent gum which processes very well on a two-roll mill at about 160° F.

EXAMPLES III THROUGH IV

A hydroxyl polyethylene adipate is prepared by the process outlined in Example I. One-half of the essentially anhydrous polyester is further reacted with p-phenylene diisocyanate generally as described in Example II, omitting the water, to form a gum (III). The other half of the polyester is reacted with p-phenylene diisocyanate and water to form a gum (IV) exactly as described in Example II. These two gums are then mixed separately on a two-roll mill each with 6 parts by weight of naphthylene-1,5-diisocyanate per 100 parts by weight of gum. The compounded stocks are vulcanized under pressure with steam heat at 280° F. for 5 and 80 minutes.

Physical properties of the cured products are tabulated below.

| Example | III | IV |
|---|---|---|
| Gum: | | |
| Molar ratio of reactants— | | |
| p-phenylene diisocyanate | 1.02 | 1.18 |
| polyethylene adipate | 1.00 | 1.00 |
| water | 0.00 | 0.20 |
| milling temperature, ° F. | 160 | 160 |
| Stress-Strain Results: | | |
| 300% modulus, p. s. i.— | | |
| 5' at 280° F. | 550 | 800 |
| 80' at 280° F. | pitted | 900 |
| Tensile Strength, p. s. i.— | | |
| 5' at 280° F. | 5,200 | 5,500 |
| 80' at 280° F. | 4,650 | 8,000 |
| 160' at 280° F. | 4,600 | 9,100 |
| Elongation, percent— | | |
| 5' at 280° F. | 700 | 625 |
| 80' at 280° F. | 625 | 765 |

The cured stock of gum III was pitted with holes and generally the stress-strain results are inferior to those of the cured stock of gum IV of this invention. The physical properties of other gums prepared similarly to III are not reproducible, being both better and worse than the example given here. On the other hand, other gums prepared in the same manner as IV result consistently in stocks free of bubbles and holes with superior physical properties.

EXAMPLES V THROUGH IX

In these examples will be found results showing the effect of varying the amount of naphthylene-1,5-diisocyanate employed, to effect the vulcanization, on two gums prepared with different amounts of water. The polyesters and gums are prepared as described in Examples I and II. The samples are cured at 298° F. for 40 and 80 minutes.

| Example | V | VI | VII | VIII | IX |
|---|---|---|---|---|---|
| Gum: | | | | | |
| Ratio Reactants, Mol— | | | | | |
| p-phenylene diisocyanate | 1.25 | 1.25 | 1.25 | 1.40 | 1.40 |
| polyethylene adipate | 1.00 | 1.00 | 1.00 | 1.00 | 1.00 |
| water | 0.30 | 0.30 | 0.30 | 0.50 | 0.50 |
| Parts by weight of naphthylene-1,5,-diisocyanate per 100 parts of polyester | 2.0 | 3.6 | 4.8 | 5.5 | 7.2 |
| Stress-strain Results: | | | | | |
| 300% modulus, p. s. i.— | | | | | |
| 40' at 298° F. | 400 | 580 | 800 | 1,000 | 1,400 |
| 80' at 298° F. | 400 | 750 | 900 | 1,500 | 1,650 |
| Tensile Strength, p. s. i.— | | | | | |
| 40' at 298° F. | 6,800 | 10,600 | 7,700 | 6,450 | 8,100 |
| 80' at 298° F. | 8,000 | 10,600 | 7,200 | 8,450 | 9,000 |
| Elongation, percent— | | | | | |
| 40' at 298° F. | 750 | 775 | 675 | 725 | 675 |
| 80' at 298° F. | 835 | 785 | 615 | 715 | 600 |

EXAMPLE X

Other gums are prepared by the procedure outlined in Example II. The molar ratio of reactants employed is 1.20 p-phenylene diisocyanate, 1.00 hydroxyl polyethylene adipate and 0.25 water. The source of the water is an amount of $Na_2SiO_3 \cdot 9H_2O$, $H_3BO_3$ and

$K_2Al_2(SO_4)_4 \cdot 24H_2O$ equivalent to 0.25 mol of water which are mixed with the polyester. These materials produce gums which are then cured with p-phenylene diisocyanate. Snappy well cured gums free of holes and bubbles are obtained. Ageing the gums for an hour at about 50° C. results in less blowing than if the gums are used immediately after mixing.

The modified polyesterurethane gums may be processed like other rubbery materials in standard factory equipment. The gum is amenable to the usual compounding techniques known to and used by those skilled in the art. Reinforcing agents, fillers, coloring agents, softeners and the like may be added to the gum before, at the same time or after the curing agent is added, but before vulcanizing. As has already been pointed out, the vulcanized gum stocks of this invention have extremely high tensile strengths, good moduli and elongation values, good resistance to hydrocarbon solvents, oils and greases and exceptionally good abrasion and oxidation resistance. Consequently, these elastomers find many uses in the rubber field in mechanical goods, for coatings, as cements, in tires and the like.

Although we have described representative embodiments of the invention, we do not desire or intend that it be limited solely thereto, as it will be apparent to those skilled in the art that modifications and variations may be made without departing from the spirit and scope of the invention as defined in the appended claims.

We claim:

1. A rubbery, processable, essentially linear polyesterurethane gum comprising the reaction product of a mixture of 0.1 to 1.0 mol of water and one mol of a linear hydroxyl terminated aliphatic polyester having a molecular weight from 400 to about 1600, with 1.0 to 2.0 mols of an organic diisocyanate containing isocyanate groups as the sole reactive groups.

2. A rubbery, processable, essentially linear polyesterurethane gum comprising the reaction product of a mixture of 0.1 to 1.0 mol of water and one mol of a hydroxyl terminated polyester comprising the reaction product of an aliphatic dicarboxylic acid and a glycol and having a molecular weight from about 500 to about 1500, with an amount of an aromatic diisocyanate containing isocyanate groups as the sole reactive groups substantially equivalent to the sum of the mols of said polyester plus water.

3. A rubbery, processable, essentially linear polyesterurethane gum comprising the reaction product of a mixture of 0.1 to 0.5 mol of water and one mol of hydroxyl terminated linear aliphatic polyester having a molecular weight from about 1200 to about 1500, with an amount of an aromatic diisocyanate containing isocyanate groups as the sole reactive groups substantially equivalent to the sum of the mols of said hydroxyl polyethylene adipate and water.

4. The polyesterurethane gum of claim 3 wherein the hydroxyl terminated linear aliphatic polyester is hydroxyl polyethylene adipate.

5. The polyesterurethane gum of claim 4 wherein the aromatic diisocyanate is para-phenylene diisocyanate.

6. A rubbery, processable, essentially linear polyesterurethane gum comprising the reaction product of a mixture of about 0.2 to 0.5 mol of water and one mol of hydroxyl polyethylene adipate having a molecular weight of about 1200 to about 1500, with from about 1.18 to 1.40 mols of para-phenylene diisocyanate.

7. A rubbery, processable, essentially linear polyesterurethane gum comprising the reaction product of a mixture of a molar quantity of a substance capable of releasing 0.1 to 1.0 mol of water at about 75° C. to 110° C. and one mol of a linear hydroxyl terminated aliphatic polyester having a molecular weight from 400 to about 1600, with 1.0 to 2.0 mols of an organic diisocyanate containing isocyanate groups as the sole reactive groups.

8. A rubbery, processable, essentially linear polyesterurethane gum capable of being milled at a temperature of between about 170° F. and 250° F. comprising the reaction product of a mixture from 0.1 to 1.0 mol of water and one mol of a linear hydroxyl terminated aliphatic polyester having a molecular weight from about 500 to about 1500, with a molar quantity of an organic diisocyanate containing isocyanate groups as the sole reactive groups substantially equivalent to the sum of the mols of said polyester and water.

9. A rubbery, processable, essentially linear polyesterurethane gum capable of being milled at a temperature between about 170° F. and 250° F. comprising the reaction product of a mixture of from about 0.2 to 0.5 mol of water and one mol of hydroxyl polyethylene adipate having a molecular weight from about 1200 to about 1500, with about 1.15 to 1.55 mols of a phenylene diisocyanate containing isocyanate groups as the sole reactive groups.

10. A vulcanized polyesterurethane gum comprising (1) the reaction product of a mixture of 0.1 to 1.0 mol of water and one mol of a linear hydroxyl terminated aliphatic polyester having a molecular weight from about 400 to about 1600, with 1.0 to 2.0 mols of an organic diisocyanate containing isocyanate groups as the sole reactive groups and (2) from about 2 to 20 weight parts per 100 weight parts of (1) of a vulcanizing agent selected from the group consisting of organic polyisocyanates and formaldehyde liberating substances.

11. The process for producing a rubbery, processable, essentially linear polyesterurethane gum which comprises preparing a mixture of 0.1 to 1.0 mol of water and one mol of a linear hydroxyl terminated aliphatic polyester having a molecular weight from 400 to about 1600 and reacting by heating said mixture with 1.0 to 2.0 mols of an organic diisocyanate containing isocyanate groups as the sole reactive groups.

12. The process for producing a rubbery, processable, essentially linear polyesterurethane gum which comprises preparing a mixture of 0.2 to 0.5 mol of water and one mol of a hydroxyl terminated polyester comprising the reaction product of an aliphatic dicarboxylic acid and a glycol and having a molecular weight from about 500 to about 1500, and reacting by heating said mixture with a molar amount of an aromatic diisocyanate containing isocyanate groups as the sole reactive groups substantially equivalent to the sum of the mols of said polyester and water.

13. The process for producing a rubbery, processable, essentially linear polyesterurethane gum capable of being milled at a temperature of between about 170° F. and 250° F. which comprises preparing a mixture of 0.2 to 0.5 mol of water and one mol of hydroxyl polyethylene adipate having a molecular weight from about 1200 to 1500 and reacting by heating said mixture with a molar amount of a phenylene diisocyanate substantially equivalent to the sum of the mols of said polyethylene adipate and water.

References Cited in the file of this patent

UNITED STATES PATENTS

| | | |
|---|---|---|
| 2,621,166 | Schmidt et al. | Dec. 9, 1952 |
| 2,625,532 | Seeger | Jan. 13, 1953 |

OTHER REFERENCES

Bayer et al.: Rubber Chemistry & Technology, October–December 1950, pages 812–835.

UNITED STATES PATENT OFFICE

CERTIFICATE OF CORRECTION

Patent No. 2,785,150                                  March 12, 1957

Leonard C. Kreider et al.

It is hereby certified that error appears in the printed specification of the above numbered patent requiring correction and that the said Letters Patent should read as corrected below.

Column 2, line 17, for "to product", read -- to produce --; column 4, line 18, for "wgith" read -- with --; column 8, line 11, after "0.2 to" insert -- about --; line 13, strike out "about", second occurrence.

Signed and sealed this 31st day of December 1957.

(SEAL)
Attest:
KARL H. AXLINE
Attesting Officer

ROBERT C. WATSON
Commissioner of Patents